United States Patent
Bhide

[19]

[11] Patent Number: 5,950,677
[45] Date of Patent: Sep. 14, 1999

[54] PRESSURE EQUALIZATION VALVE

[75] Inventor: Yeshwant K. Bhide, Downington, Pa.

[73] Assignee: Diamond Power International, Inc., New Orleans, La.

[21] Appl. No.: 08/905,176

[22] Filed: Aug. 4, 1997

Related U.S. Application Data

[63] Continuation-in-part of application No. 08/501,740, Aug. 9, 1995, abandoned.

[51] Int. Cl.$^6$ .................................................. F16K 11/074
[52] U.S. Cl. ...................... 137/625.45; 137/874; 251/368
[58] Field of Search ........................ 137/625.21, 625.45, 137/874; 251/368

[56] References Cited

U.S. PATENT DOCUMENTS

| 4,273,152 | 6/1981 | Freeman | 251/317 |
| 4,635,674 | 1/1987 | Bajka | 137/625.41 |
| 4,653,990 | 3/1987 | Schlect | 137/625.45 X |

FOREIGN PATENT DOCUMENTS

| 118853 | 8/1930 | Austria | 137/625.45 |
| 7011751 | 8/1989 | Taiwan . | |

OTHER PUBLICATIONS

Engineering Data—Air Lock Control, Allen–Sherman–Hoff, 1973.
Air Lock Valve for Material Handling Systems Brochure, Allen–Sherman, Hoff, 1980.
Engineering Data—Air Lock Valve for Materials Handling Systems, Allen–Sherman, Hoff, 1976.
Engineering Data—Airlocks for Pneumatic Materials Handling Systems, Allen–Sherman–Hoff, 1989.
Pneumatic Actuator—Rack and Pinion Brochure, Bray Valve and Controls U.S.A., May 1992.

*Primary Examiner*—John Fox
*Attorney, Agent, or Firm*—Kirkpatrick & Lockhart LLP

[57] ABSTRACT

A pressure equalization valve for alternatingly equalizing pressures between a first fluid source and at least two second fluid sources is disclosed. The pressure equalization valve includes a valve body, which includes a first port in fluid communication with the first fluid source and at least two second ports in fluid communication with the at least two second fluid sources, respectively, and a valve gate movable between a first equalizing position, wherein the valve gate allows fluid flow through one of the second ports and restrains fluid flow through another of the second ports to equalize substantially the fluid pressure between the first fluid source and one of the second fluid sources, and a second equalizing position, wherein the valve gate restrains fluid flow through the one of the second ports and allows fluid flow through the other of the second ports to equalize substantially the fluid pressure between the first fluid source and another of the second fluid sources. The valve further includes a chamber in the valve body between the first port and the second ports, wherein, as measured in planes that is sized to substantially reduce the velocity of fluid flowing between the first and second ports.

23 Claims, 13 Drawing Sheets

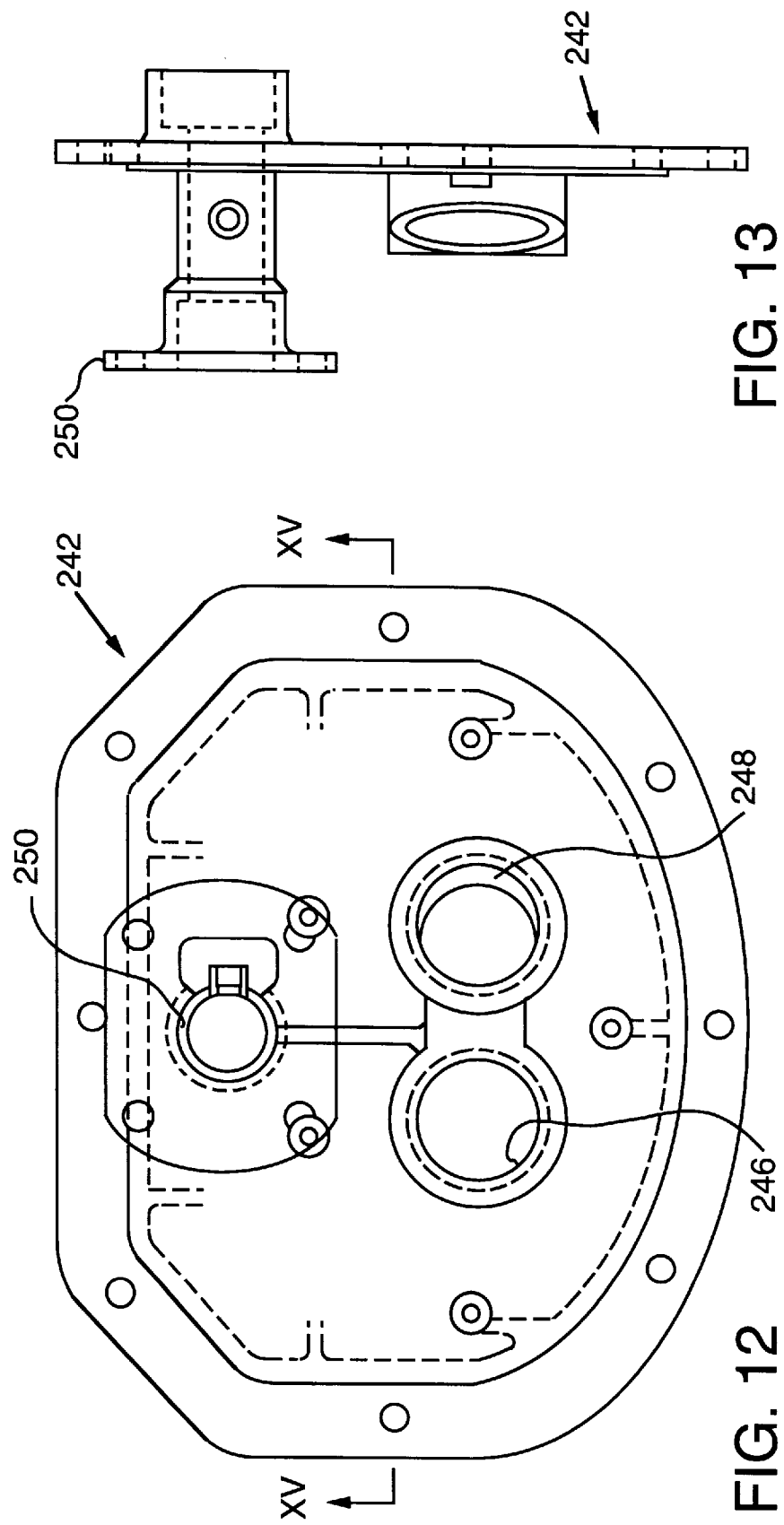

PRESSURE EQUALIZATION VALVE

CROSS REFERENCE TO RELATED APPLICATIONS

The subject application is a continuation-in-part application of U.S. patent application Ser. No. 08/501,740, Filed Aug. 9, 1995, now abandoned.

STATEMENT REGARDING FEDERALLY FUNDING RESEARCH

Not Applicable.

BACKGROUND OF THE INVENTION

1. Field of the Invention

The present invention relates to devices useful for equalizing fluid pressures. More particularly, the present invention relates to pressure equalization valves useful for equalizing fluid pressures between plural fluid sources.

2. Description of the Invention Background

As shown in FIG. 1, which is a diagram of a prior art material handling system, an airlock, such as an airlock 1, is a device used for the transfer, by gravity, of fly ash or other dry, free-flowing granular solids from one pressure zone to another. For example, in the system of FIG. 1, granular solids are collected in an overhead hopper 2 and are dropped into the airlock 1 in controlled volumes through operation of a pneumatically-operated valve 3. Each controlled volume of granular solids is then dropped, by means of another pneumatically-operated valve 4, into a conveying pipe 5 carrying a supply of pressurized conveying fluid, such as air. The air in the conveying pipe is generally compressed up to 20 psi, but may be compressed up to 25 psi.

Because the pressurized conveying fluid is normally at a much higher pressure than the near-atmospheric pressure inside the airlock 1, the pressure differential would slow down the movement of solids from the airlock 1 into the pipe 5 if it were not equalized. Accordingly, prior art material handling systems such as that shown in FIG. 1 often include a pressure equalization valve 6.

With reference to FIG. 1 and FIGS. 2–3, which illustrate two prior art equalization valves 6', 6", equalization valves 6', 6" each include a port 7', 7", respectively, in fluid communication with an airlock 1 via a fluid line 7, a port 8', 8", respectively, in fluid communication with a conveying pipe 5 at point 5a via a fluid line 8, and a port 9', 9", respectively, in fluid communication with a hopper 2 via a fluid line 9. Each equalization valve 6', 6" also includes valve gates 10', 10", respectively, operable by an actuator 11', 11", respectively, for alternately sealing the ports 8', 9' and 8", 9", respectively.

An equalization valve 6, 6', 6" normally operates as follows. Before a volume, of granular solids is dropped from the hopper 2 into the airlock 1, the valves 3, 4 are in a closed position. The actuator 11', 11", respectively, is in a position such that the port 8', 8", respectively, is sealed and the port 9', 9" is open. The hopper 2 and the airlock 1 are thus in fluid communication, and the pressure of the air in the hopper 2 above the solids and the pressure of the air in the airlock 1 are nearly equal and nearly at atmospheric pressure. The volume of granular solids is then dropped into the airlock 1 by opening and timed closing of the valve 3, and the actuator 11', 11", respectively, is then operated so that the port 8', 8", respectively, is open and the port 9', 9", respectively, is sealed. The conveying pipe 5 is thus in fluid communication with the airlock 1 at point 5a, and the pressure of the air in the airlock 1 thus nearly equalizes to the much higher pressure of the air in the conveying pipe 5 at point 5a. The pressures normally do not completely equalize because of the pressure drops inherent in the system. The entire pressure equalization process usually takes no more than 5–15 seconds, depending on the volume of the airlock 1.

The solids are then dropped into the conveying pipe 5 at point 5c by the opening of the valve 4, and are carried away through the pipe 5. It should be noted that the pressure of the air at the point 5c is much lower than at the point 5a (and thus in the airlock 1), because an orifice is interposed in the pipe 5 at point 5b intermediate points 5a and 5c. The resultant pressure drop between the airlock and point 5c encourages the flow of solids into the pipe 5. When the valve 4 is closed, some residual solids generally remain in the airlock 1. The actuator 11', 11", respectively, is then operated to seal the port 8', 8", respectively, and to open the port 9', 9", respectively, such that the airlock 1 and the hopper 2 are again in fluid communication and the pressure of the air in the airlock 1 can equalize with the near-atmospheric pressure of the air in the hopper 2. During each pressure equalization process, the velocity of the air passing through the equalization valve 6', 6" can reach almost sonic speeds, due to the extreme pressure differential between the air in the conveying pipe 5 and the airlock 1, and then the airlock 1 and the hopper 2. In addition, during the pressure equalization process between the airlock 1 and the hopper 2, the air flowing through the equalization valve 6', 6" normally entrains a significant amount of loose granular solids from the airlock 1, which air/solids mixture is normally very abrasive when flowing at high speeds.

Prior art pressure equalization valves 6', 6" have significant disadvantages. First, such valves 6', 6" tend to have very rapid wear rates, especially with respect to the valve ports 9', 9", the valve gates 10', 10" and the actuators 11', 11", respectively, which are cyclically subjected to blasts of granular articulates entrained in air streams moving at near-sonic speeds. It has been estimated that wear rates on such parts are proportional to $v^3$, where v is equal to the velocity of the air-solids mixture. For some prior art equalization valves 6, it is not uncommon for the valves 6 to require replacement within three months of being put into service.

Further, pressure equalization valves such as the valves 6', 6" are designed such that, when an actuator 11', 11", respectively, is operated to move between port sealing positions, there is a period of time where both the port 8', 9' and the port 8", 9", respectively, are open, allowing pressure equalization between the airlock 1, the hopper 2 and the conveying pipe 5 all at the same time. In systems that are vacuum-operated, as opposed to the pressurized system shown in FIG. 1, this transient three-way equalization has been found to result in the suction of granular solids into the vacuum pumps, and thus increased maintenance of such pumps.

Pressure equalization valves of the types described above are typically associated with relative high maintenance costs. For example, valves used in connection with the transmission of particulate such as ash and the like typically suffer significant wear problems. Such particulate material tends to erode the gate and seats which, over time, can cause leaks to develop when the gate is closed. Often times, when such leaks develop, the system must be disabled to permit the valve to be accessed and or replaced. Such system downtime can lead to increased operating costs. Furthermore, due to their design, prior valves often must be substantially disassembled to gain access to the worn parts.

In some valve designs, because the seats are machined into the housing, the valve housing must be replaced or repaired leading to increased maintenance costs and downtime.

In view of the above, it is a feature of the present invention to provide an improved pressure equalization valve.

It is another feature of the present invention to provide a pressure equalization valve that wears at a relatively slow rate.

A further feature of the present invention is to provide a pressure equalization valve that restrains unintended transient equalization of fluid sources.

Another feature of the present invention is to provide a pressure equalization valve having internal components that are relatively wear resistant.

Yet another feature of the present invention is to provide a pressure equalization valve having internal components that are relatively easy to service and replace.

SUMMARY OF THE INVENTION

The above features as well as other features not specifically enumerated are accomplished by a pressure equalization valve for alternatingly equalizing pressures between a first fluid source and at least two second fluid sources, in accordance with the present invention. The pressure equalization valve of the present invention includes a valve body, which includes a first port that has a central axis and is in fluid communication with the first fluid source and at least two second ports each having a central axis and being in fluid communication with the at least two second fluid sources, respectively. The second ports are arranged such that the central axis of at least one second port forms an acute angle with the central axis of the first port. The valve also includes a valve gate movable between a first equalizing position, wherein the valve gate allows fluid flow through one of the second ports and restrains fluid flow through another of the second ports to equalize substantially the fluid pressure between the first fluid source and one of the second fluid sources, and a second equalizing position, wherein the valve gate restrains fluid flow through one of the second ports and allows fluid flow through the other of the second ports to equalize substantially the fluid pressure between the first fluid source and another of the second fluid sources. The valve further includes a chamber in the valve body between the first port and the second ports that has a predetermined volume such that the velocity of fluid flowing between second ports is substantially reduced.

BRIEF DESCRIPTION OF THE DRAWINGS

The preferred embodiments of the present invention will be described in greater detail with reference to the accompanying drawings, wherein like members like reference numerals and wherein:

FIG. 12 is a plan view of the top side of a preferred cover-plate of the valve depicted in FIG. 9;

FIG. 13 is a side elevational view of the cover plate of FIG. 12;

DETAILED DESCRIPTION OF THE PREFERRED EMBODIMENT

Figure 1:
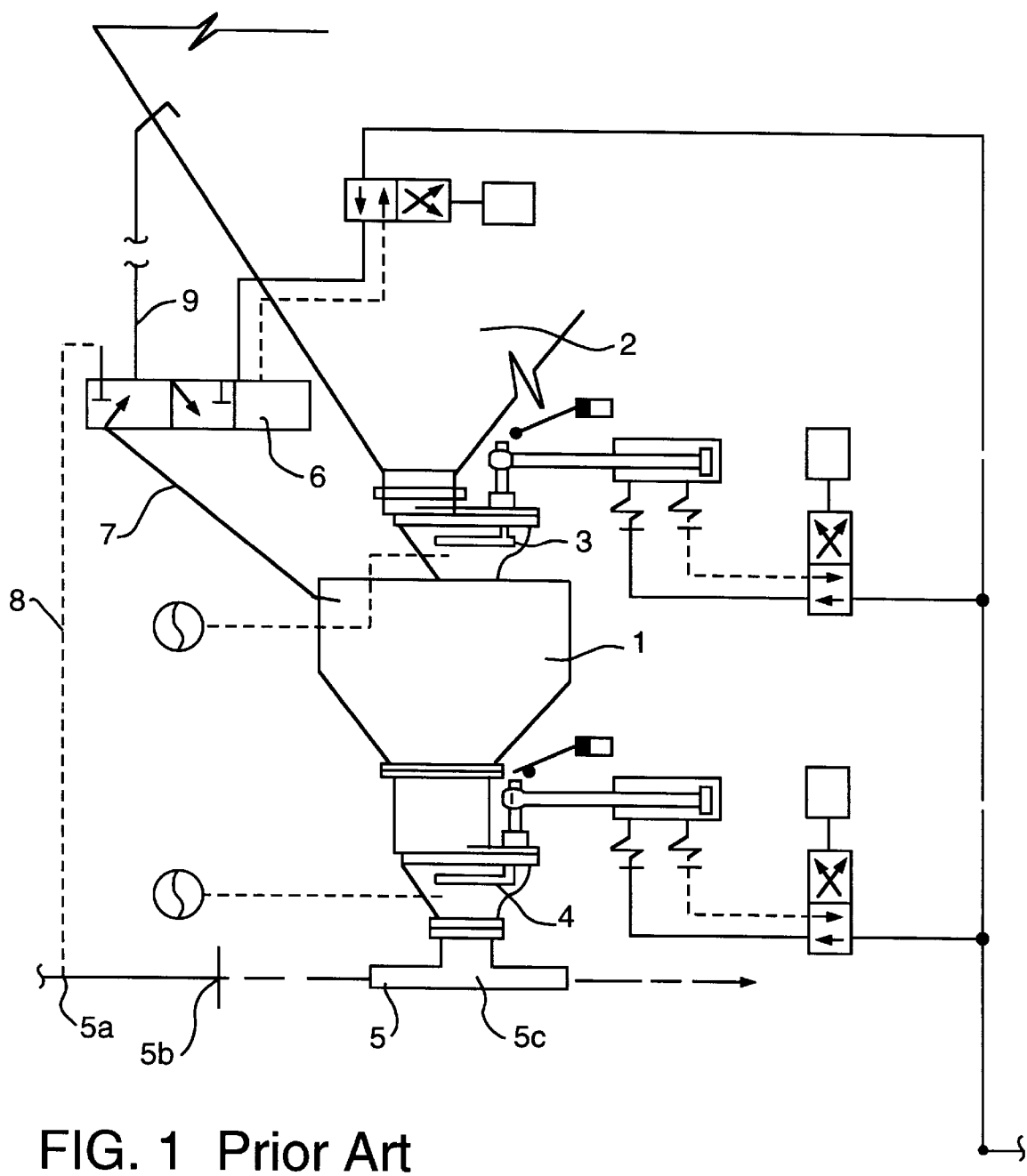
FIG. 1 is a diagram of a prior art material handling system.
Figure 2:
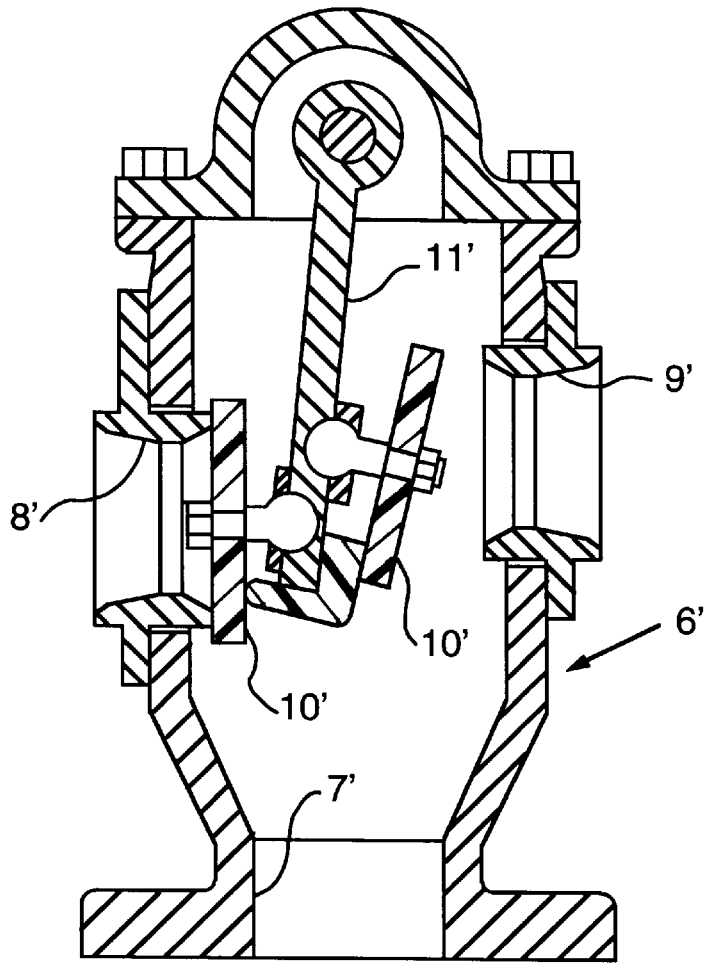
FIG. 2 is a cross sectional view of a prior art pressure equalization valve.
Figure 3:
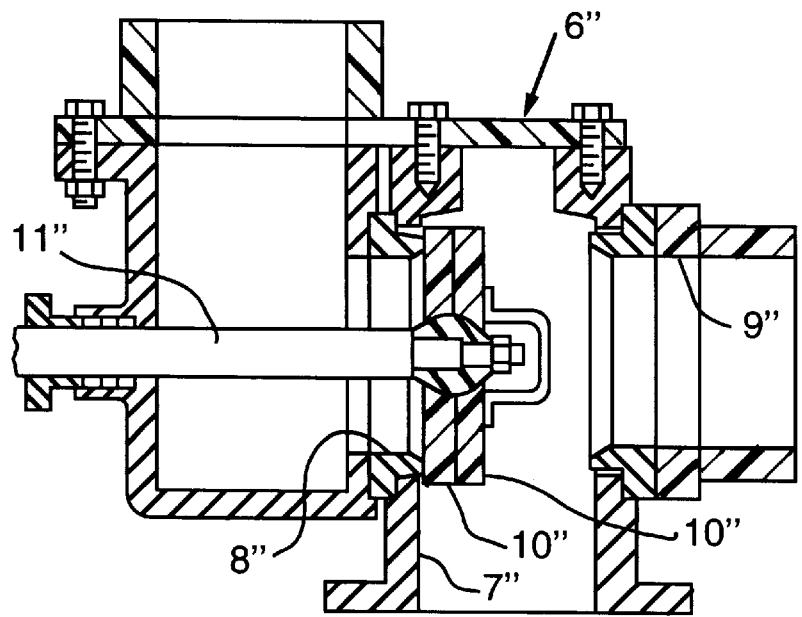
FIG. 3 is a cross sectional view of another prior art pressure equalization valve.
Figure 4:
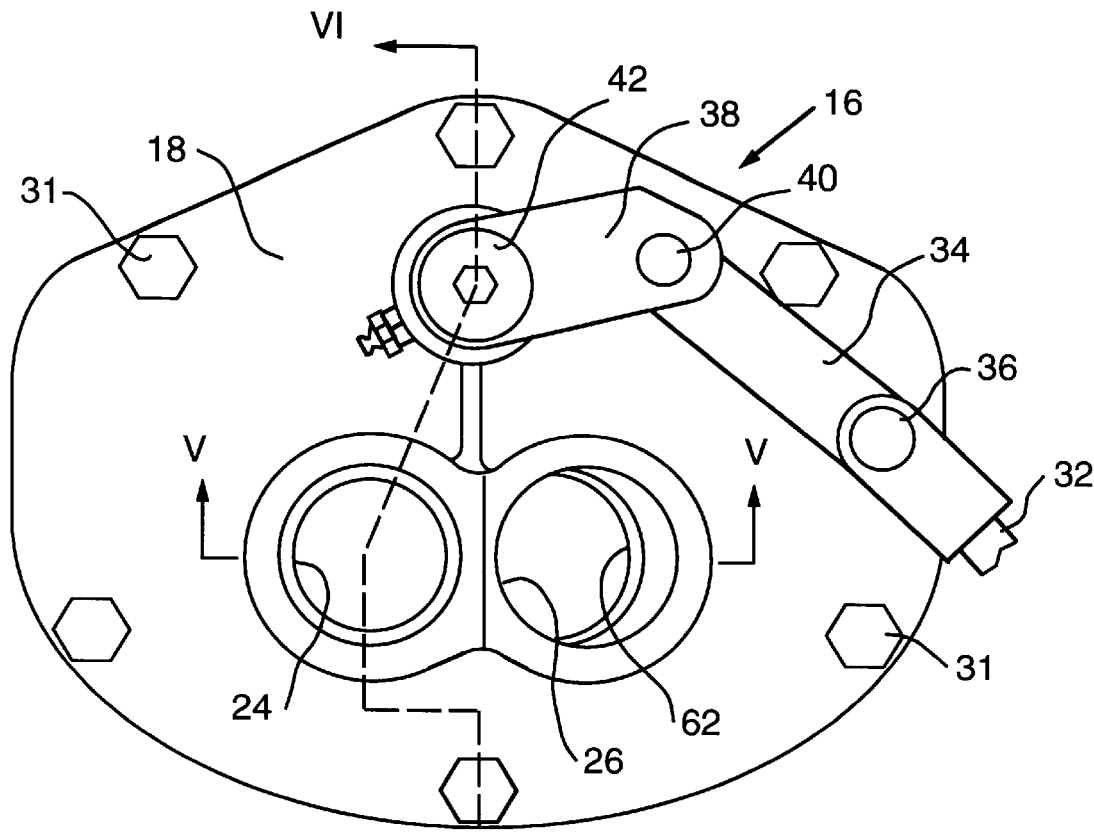
FIG. 4 is a front elevational view of a first embodiment of a pressure equalization valve of the present invention.
Figure 5:
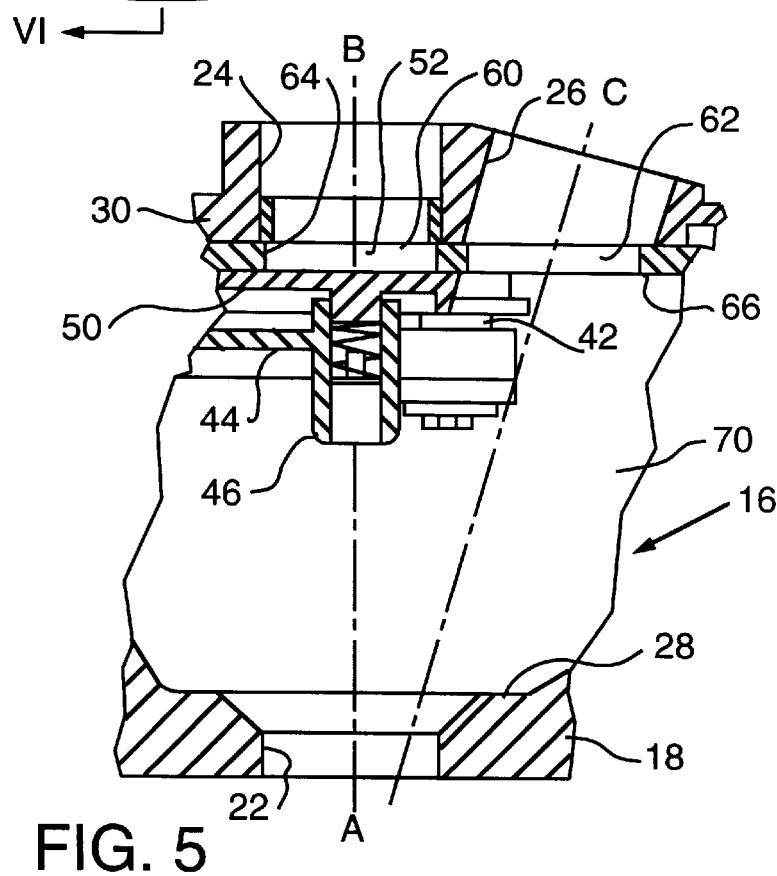
FIG. 5 is a cross sectional view along line V—V of FIG. 4.

With reference to FIGS. 4–7, a pressure equalization valve 16, in accordance with a first embodiment of the present invention, includes a valve body 18, a first port 22 in fluid communication with a first fluid source, such as air within the airlock 1 in the material handling system of FIG. 1, and a pair of second ports 24, 26 in fluid communication with a pair of second fluid sources, such as air within the hopper 2 and pressurized air within the conveying pipe 5, respectively. As shown in FIG. 5, the first port 22 is located along a first wall 28 of the valve body 18, and the second ports 24, 26 are located along a second wall 30 of the valve body 18, which second wall 30 is directly opposite the first wall 28.

Moreover, a central axis A of the first port 22 and a central axis B of the second port 24 lie along portions of the same line (see FIGS. 5 and 6), and the second port 26 is angled acutely by about 10–15 degrees relative to that line, such that the central axis C of the second port 26 lies along a line that is acutely angled relative to the axis A by about 10–15 degrees and that extends into the first port 22 (see FIG. 5). The significance of these features will be explained further hereinbelow.

Figure 6:
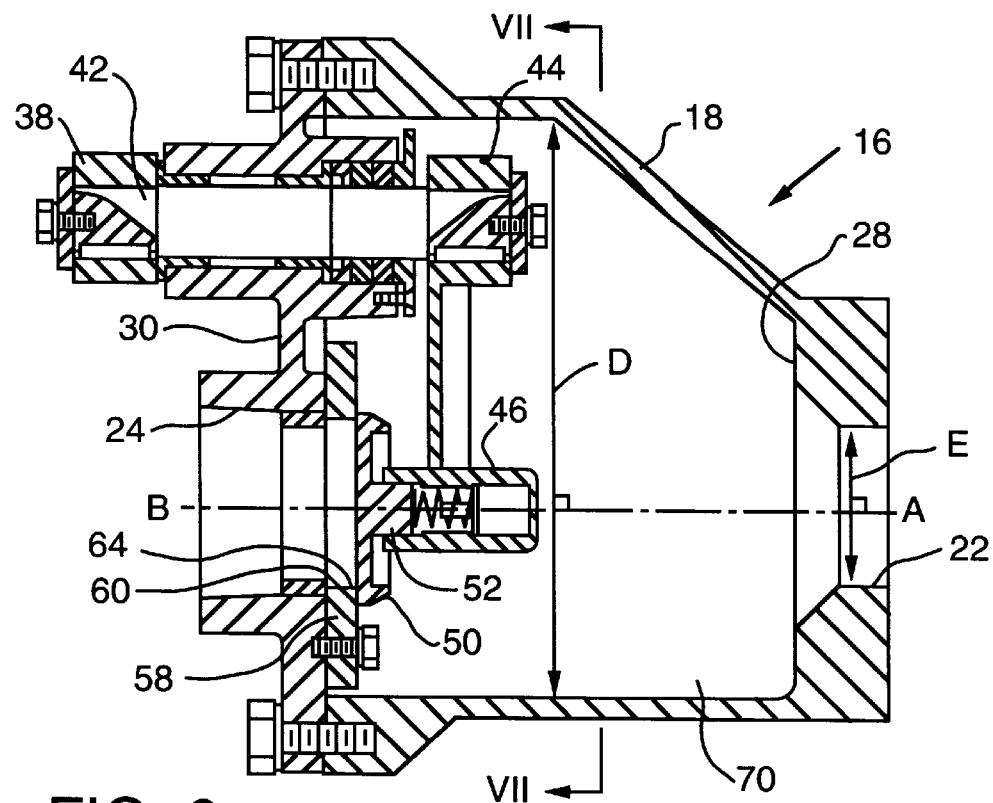
FIG. 6 is a cross sectional view along line VI—VI of FIG. 4.
Figure 7:
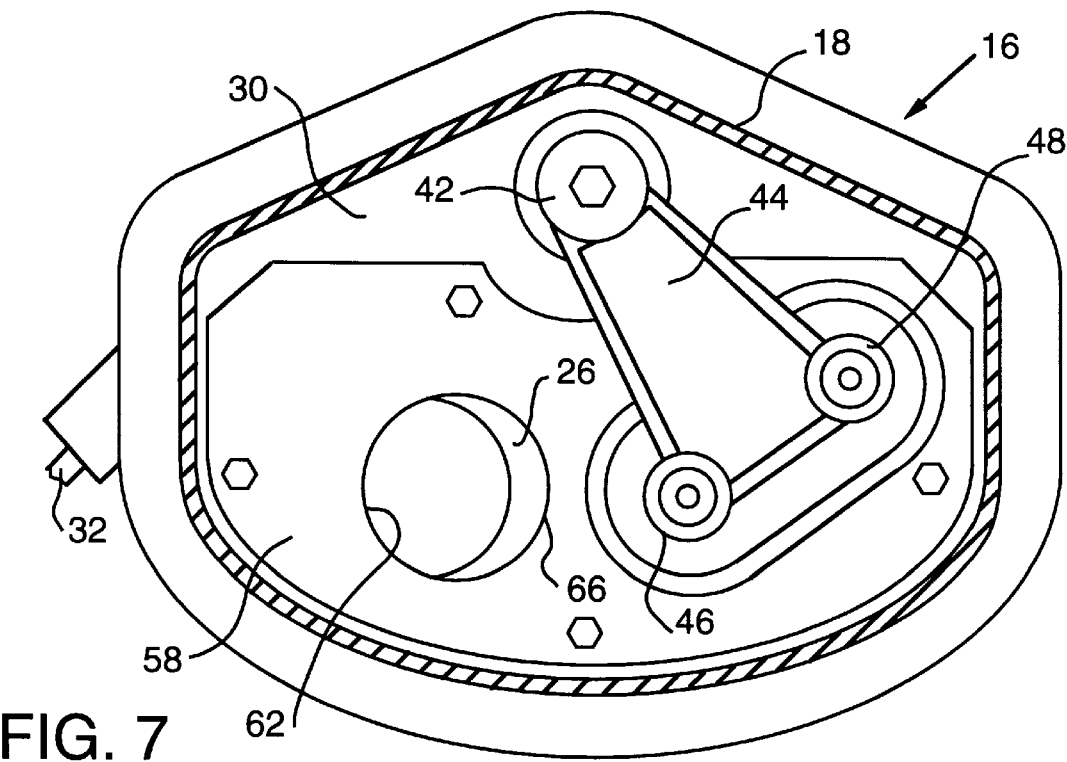
FIG. 7 is a cross sectional view along line VII—VII of FIG. 6.

The valve 16 also includes a piston 32 slidingly connected to a cylinder (not shown) and pivotally connected to a link 34 by a pin 36. The link 34 is pivotally connected to a link 38 by a pin 40, and the link 38 is fixed to a pivot pin 42 to restrain rotation of the link 38 relative to the pivot pin 42. Within the valve body 18, a valve actuator 44 is fixed to the pivot pin 42 such that rotation of the valve actuator 44 relative to the pivot pin 42 is also restrained. As can be seen in FIGS. 6 and 7, the valve actuator 44 is roughly triangular in shape, and includes a pair of hollow cylindrical extensions 46 therein. An elongated ovoid valve gate 50 preferably made of ground Ni-Hard and having a pair of solid cylindrical extensions 52 thereon is provided such that the solid extensions 52 are slidingly mounted within the hollow extensions 46. Each of the hollow extensions 46 includes a spring, such as a coil spring 56, therein to spring bias the valve gate 50 away from the valve actuator 44. The valve body 18 further includes a valve seat plate 58 preferably made of ground Ni-Hard and attached on an inner surface of the second wall 30. The valve seat plate 58 has a pair of openings 60, 62 therein to form coplanar valve seats 64, 66, respectively, at the two second ports 24, 26. Because the valve gate 50 is spring biased away from the valve actuator 44, it is also spring biased against the valve seat plate 58. As will be discussed further hereinbelow, the valve gate 50 acts as means to control the flow of fluid through the second ports 24, 26 alternately.

All materials of which the valve 16 is constructed preferably have a 750 degree Fahrenheit temperature rating.

The valve body 18 further includes a chamber 70 intermediate the first and second walls 28, 30, respectively, and thus between the first port 22 and the second ports 24, 26, respectively. The chamber 70 is very large relative to the ports 22, 24, 26. Thus, when measured in planes perpendicular to the central axis A of the first port 22, such as planes containing the lines D and E shown in FIG. 6, the largest cross-sectional area of the chamber 70 is substantially larger than the smallest cross sectional area of the first port 22, as will be discussed further hereinbelow.

With reference to FIGS. 1 and 4–7, the structure and operation of the first embodiment of the pressure equalization valve 16 will now be explained. As discussed above, the first port 22 is normally in fluid communication with a first fluid source, such as the air within the airlock 1 via the fluid line 7, one second port 24 is normally in fluid communication with one second fluid source, such as the hopper 2 via the fluid line 9, and another second port 26 is normally in fluid communication with another second fluid source, such as the conveying pipe 5 via the fluid line 8. In a first equalizing position, the valve actuator 44 and the valve gate 50 are rotated roughly 80–85 degrees clockwise from the position shown in FIG. 7. The valve gate 50 is spring biased against and extends across the valve seat 66 to close the opening 62, and thus fluid flow through the second port 26 is restrained and fluid flow through the second port 24 is allowed by the valve gate 50. The valve gate 50 would be in the first equalizing position if the valve 16 were being used in the system of FIG. 1 and a volume of granular solids was waiting to be dropped from the hopper 2 into the airlock 1. The hopper 2 and the airlock 1 would thus be in fluid communication, and the pressure of the air in the hopper 2 above the solids and the pressure of the air in the airlock 1 would be nearly equal and nearly at atmospheric pressure. The volume of granular solids could then be dropped into the airlock 1 by means of the valve 3.

When the piston 32 is controlled to retract and to pull the links 34, 38 clockwise in FIG. 4 and thus to rotate the pivot pin 42 clockwise in FIG. 4, rotation of the pivot pin 42 (counterclockwise in FIG. 7) causes the valve actuator 44 and thus the valve gate 50 to rotate counterclockwise in FIG. 7 with the pivot pin 42. The valve gate 50 thus moves from the first equalizing position to an intermediate position, wherein the valve gate 50 is spring biased against and extends across both valve seats 64, 66 to close both openings 60, 62 and restrain fluid flow through both second ports 24, 26. From this point in its movement, the valve gate 50 remains spring biased against the valve seat 64, but continued movement causes the valve gate 50 to slide across the opening 66 until the valve gate 50 is in a second equalizing position wherein the valve gate 50 is spring biased against and extends across only the valve seat 64 to close only the opening 60. In the second equalizing position, shown in FIG. 7, the valve seat 50 thus restrains fluid flow through the second port 24 and allows fluid flow through the second port 26 to equalize substantially the fluid pressure between the first fluid source and the other second fluid source. If the valve 16 were being used in the system of FIG. 1, the conveying pipe 5 would thus be in fluid communication with the airlock 1, and the pressure of the air in the airlock 1 would thus substantially equalize to the much higher pressure of the air in the conveying pipe 5. The pressures normally would not completely equalize because of the pressure drops inherent in the system. The solids would then be dropped into the conveying pipe 5 by means of the valve 4 and carried away through the pipe 5.

When the piston 32 and thus the valve actuator 44 are operated in reverse, the valve gate 50 moves back through the intermediate position to the first equalizing position, wherein fluid flow through the second port 26 is restrained and fluid flow through the second port 24 is allowed, to equalize substantially the fluid pressure between the first fluid source and the one second fluid source. If the valve 16 were being used with the system of FIG. 1, the airlock 1 and the hopper 2 would again be in fluid communication and the pressure of the air in the airlock 1 would substantially equalize with the near-atmospheric pressure of the air in the hopper 2.

During each pressure equalization process, the velocity of the fluid entering the chamber 70 in the valve body 18, for example from the first port 22, may achieve almost sonic speeds, due to the extreme pressure differentials that it is expected would exist in normal use between the first and second fluid sources, respectively. However, because, as measured in planes perpendicular to the central axis A of the first port 22, the largest cross sectional area of the chamber 70 is substantially larger than the smallest cross sectional area of the first port 22, the velocity of a fluid flowing from the first port 22 to a second port, such as the second port 24, will be substantially reduced.

This result is dictated by the mass flow rate equation, which states that for a fluid flowing through an enclosed space, the cross sectional area of the space multiplied by the velocity and density of the fluid equals a constant. Thus, if the cross sectional area of the space increases, the fluid velocity should decrease proportionally, assuming the density remains constant. When the fluid flowing through the valve 16 consists of particulate matter entrained in a gas, it has been found that the particulate matter generally remains entrained in the gas while traveling through the chamber 70. Thus the density of the fluid remains fairly constant, although the density of the fluid does drop a fairly insignificant amount due to normal pressure losses in the fluid lines and the valve 16. Accordingly, the increased cross sectional area of the chamber 70 appears to produce a substantial reduction of the velocity of such a fluid flowing through the chamber 70. In actual tests, a valve including a chamber having a largest cross sectional area of roughly 14 times the smallest cross sectional area of a first port has been found to have substantially improved wear rates over prior art pressure equalization valves. It is estimated that the velocity of the fluid flowing within such valve is reduced by about 14 times from a first port to a second port. As stated above it is believed that the wear rate varies proportionally with $v^3$, and it is thus estimated that the wear rate on the valve actuator and the valve gate of such valve may be reduced by as much as 2,744 times. Because of the exponential relation between velocity and wear rate, it is believed that a chamber 70 having a largest cross sectional area of 10 times the smallest cross sectional area of the first port 22 would substantially reduce the velocity of fluid flowing through the chamber, and would produce advantageous wear rate results. In such a valve, it is estimated that the fluid velocity would be reduced about 10 times, to produce a wear rate reduction on the order of $10^3$.

In addition, it is believed that the positioning of the second ports 24, 26 on the second wall 30 opposite the first port 22, such that the central axes B, C of the second ports 24, 26 either lie on the central axis A of the first port 22, or are acutely angled within 10–15 degrees relative thereto and thus lie on lines that extend into the first port 22, helps to reduce the wear rate of the internal valve parts. Because of this positioning of the second ports 24, 26, a fluid flowing from the first port 22 to a second port 24 or 26, or from a second port 24 or 26 to the first port 22, follows a relatively streamlined flow path through the valve 16, thus subjecting the internal valve parts to relatively less direct blasting from granular solids entrained in the fluid. In addition, because the valve seat plate 58 and the valve gate 50 are made of ground Ni-Hard, they are relatively wear resistant.

It should also be appreciated that because the valve gate 50 reaches the intermediate position wherein fluid flow through both of the second ports 24, 26 is restrained each time that it moves between the first and second equalizing positions, the valve 16 restrains transient cross equalization between the second fluid sources. When the valve 16 is used with a vacuum system, this feature is useful to restrain the unintended flow of granular solids entrained in a fluid into a vacuum pump, thereby reducing wear on and maintenance of the pump.

A further advantage of the present invention arises from the construction of the valve 16. Specifically, as can be seen in FIGS. 4 and 6, the second ports 24, 26, the links 34, 38, the pivot pin 42, the valve actuator 44 and the valve gate 50 are all mounted, directly or indirectly, to the second wall 30 of the valve body 18, and the second wall 30 is mounted to the remainder of the valve body 18 by six bolts 31. Thus, the valve actuator 44 and the valve gate 50 may be easily serviced or replaced merely by disconnecting the piston 32 from the pin 36, unscrewing the bolts 31 and removing the second wall 30.

Figure 8:
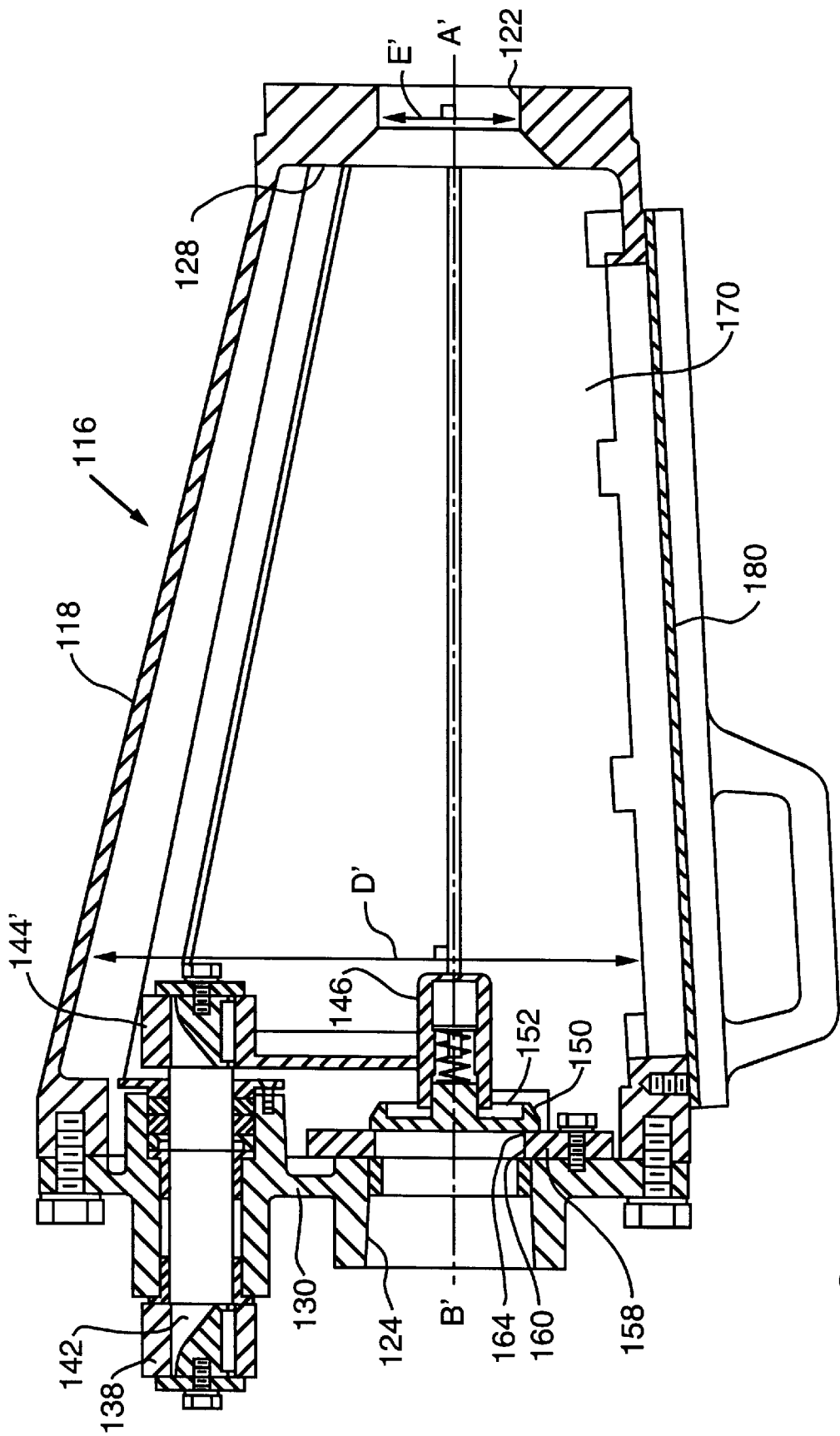
FIG. 8 is a view similar to FIG. 6 of a second embodiment of the pressure equalization valve of the present invention.

With reference to FIG. 8, a second embodiment of the pressure equalization valve 116 of the present invention is illustrated, wherein parts of the valve 116 similar to parts of the valve 16 are numbered similarly, with the addition of 100 to the numbers. The valve 116 is structured and functions identically to the valve 16, with one exception. Specifically, the valve 116 includes an elongated chamber 170, and a valve body 118 of the valve 116 includes an elongated removable door 180, to allow on-site maintenance of the valve 116. The removable door 180 is especially useful in on-site emergency situations.

It should be appreciated that, as used throughout the specification and claims, the term "fluid" is used to refer broadly to any type of fluid including a gas, a gas/solid mixture, a gas/liquid mixture, or a liquid. In addition, the term "fluid source" as used herein is used broadly to refer to any mass of fluid, including a mass under very high or very low pressure, such as would exist in a vacuum system. It should also be appreciated that, while the ports 22, 24, 26 are illustrated and described as being one piece with the valve body 18, they may be separate pieces attached to the valve body 18, or may consist of the terminal ends of fluid lines attached to the valve body 18. Also, although the valve seat plate 58 and thus the valve seats 64, 66 are illustrated and described herein as being separate from the valve body, the valve seat plate 58 may be removed from the valve 16 such that the valve seats 64, 66 would consist of the terminal ends of the ports 24, 26. In such an embodiment, the ports 24, 26 preferably would be formed such that the valve seats 24, 26 were coplanar. Further, although the operating means for operating the valve actuator 44 to move the valve gate 50 is shown as including a piston 32, links 34, 38 and pivot pin 42, other operating means, such as a rotary type of actuator, could be used and the advantages of the present invention obtained thereby.

Figure 9:
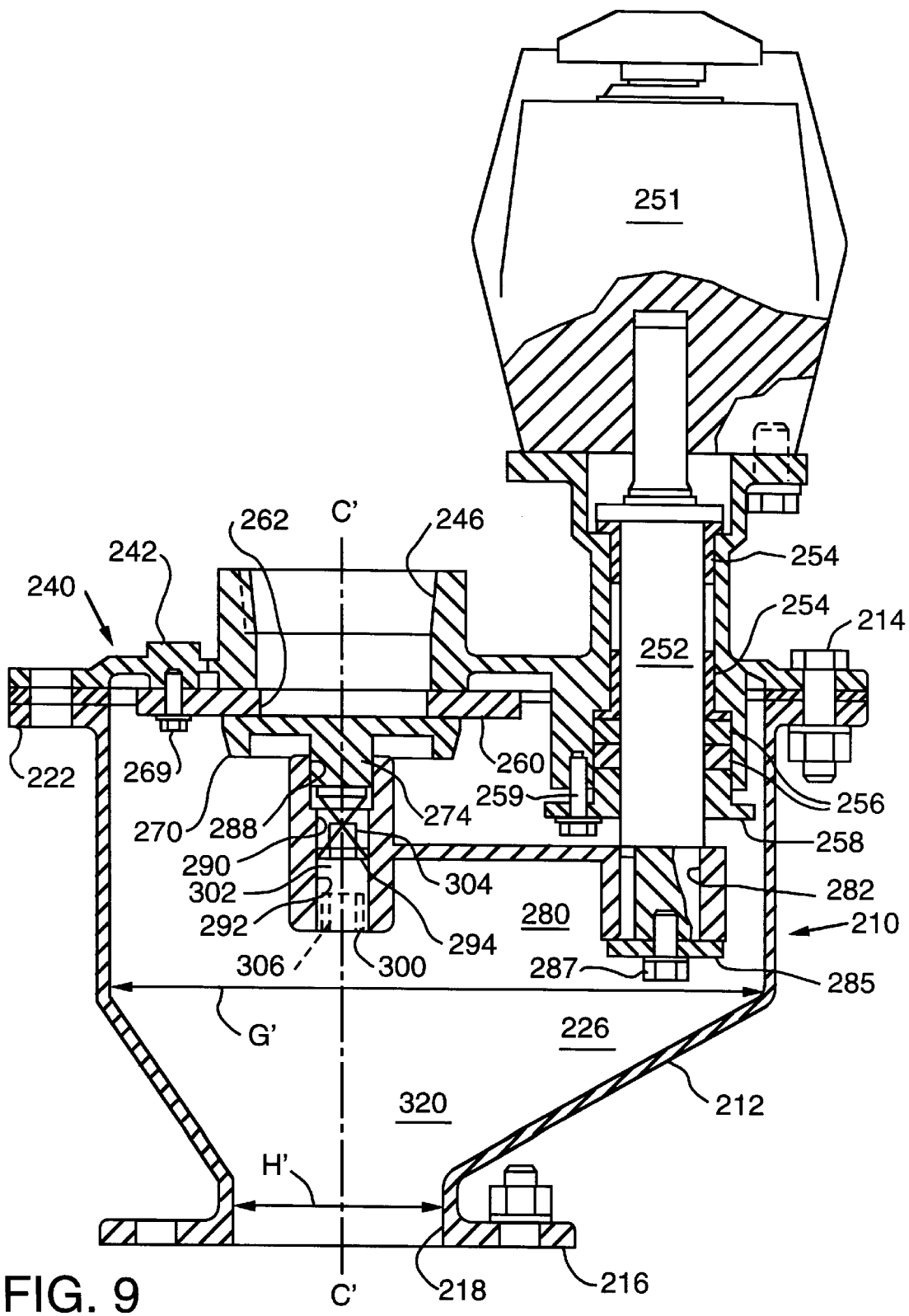
FIG. 9 is a partial cross-sectional view of another preferred valve of the present invention.
Figure 10:
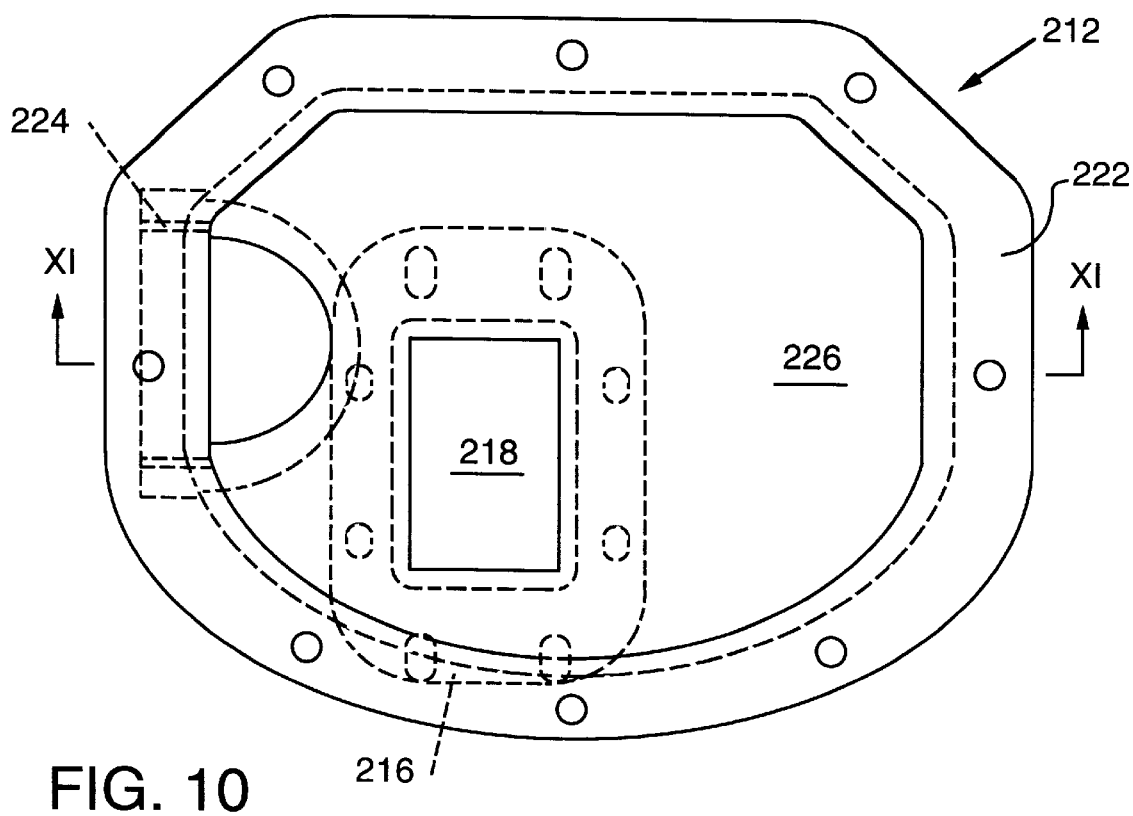
FIG. 10 is a plan view of a preferred valve housing of the valve of FIG. 9.
Figure 11:
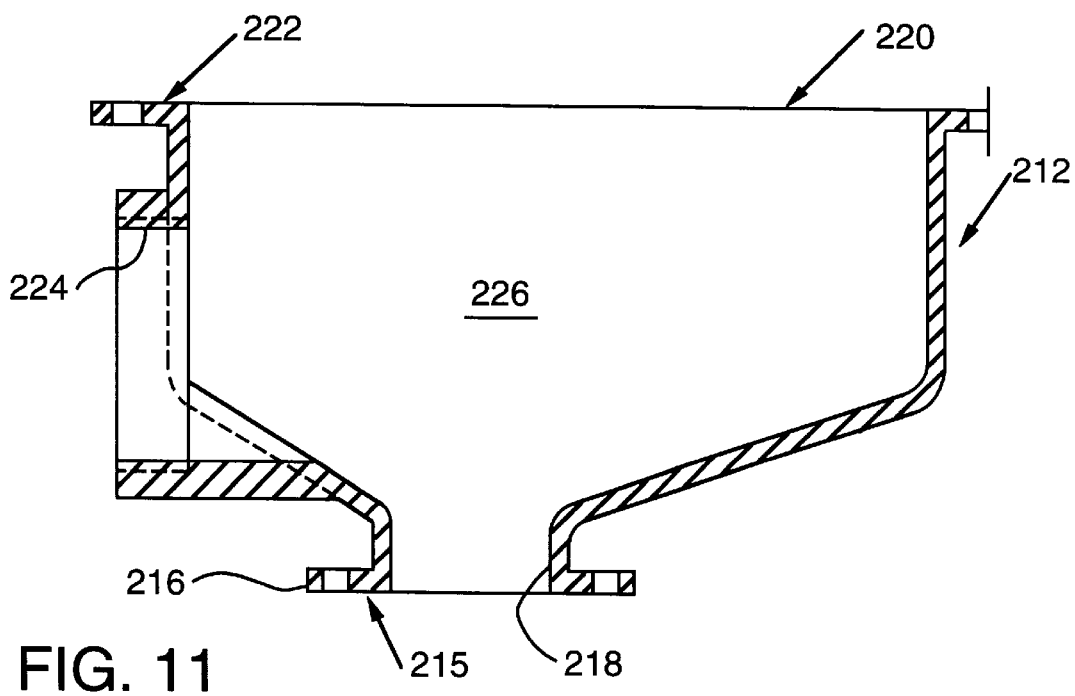
FIG. 11 is a cross-sectional view of the valve housing of FIG. 10 taken along lines XI—XI in FIG. 10.

Another preferred embodiment of the present invention is disclosed in FIGS. 9–22. In this embodiment, the pressure equalization valve 210 includes a body 212 and a cover assembly 240 that is preferably removably attached to the body 212 by a plurality of bolts 214. See FIG. 9. Body 212 has two ends (215, 220) and an interior 226 and is preferably configured as shown in FIGS. 10 and 11; however, other body configurations having preferred attributes disclosed below may also be successfully employed. End 215 of body 212 is preferably provided with flange 216 and a first port 218. The skilled artisan will appreciate that flange 216 facilitates removable attachment of body 212 to a first fluid source, such as air within the airlock 1 in the material handling system of FIG. 1. Body 212 could also be constructed such that first port 218 is threaded or other conventional attachment methods for attaching body 212 to a first fluid source could be successfully employed. By way of example, first port 218 is preferably rectangular-shaped and has a size of 2.75"×4.25" with a cross-sectional area of 11.68 square inches.

The other end 220 of body 212 is preferably formed with a flange 222 to enable a cover assembly 240 to be removably attached thereto by bolts 214. Also in a preferred embodiment, a viewing port 224 is provided in body 212 to permit visual access into the body 212 without disassembling the valve 210. Preferably, port 224 is threaded to receive a commercially available threaded plug (not shown). Those of ordinary skill in the art will appreciate that the provision of viewing port 224 permits maintenance personnel to easily monitor the wearing of the parts located in the interior 226 of the body 212. However, the viewing port 224 could also be eliminated if desired.

In this embodiment, the provision of all of the parts that may be particularly subject to wear are advantageously mounted to the cover plate 242 of the cover plate assembly 240. More particularly and with reference to FIGS. 9–15, there is shown a cover plate assembly 240 that includes a cover plate 242 and that has a perimetrically extending flange portion 244 that is adapted to mate with the flange 222 of the body 212. See FIG. 9. As shown in FIGS. 12–15, a pair of second ports (246, 248) adapted for fluid communication by 2.5" diameter female pipe threads with a pair of second fluid sources, such as air within the hopper 2 and pressurized air within the conveying pipe 5, respectively are provided in cover plate 242. By way of example, ports (246, 248) are each preferably 2.5" in diameter with a cross-sectional area of 4.79 square inches. For the purpose of explaining the preferred orientations of ports (246, 248), port 246 has an axis D'—D' and port 248 has an axis E'—E' as shown in FIG. 15. The first port 246 extends through the cover plate 242 and is arranged such that when the cover plate assembly 242 is attached to the body 212 as shown in FIG. 9, the axis D'—D' of the second fluid port 246 is preferably coaxially aligned with axis C'—C' of the first port 218 in body 212. The axis E'—E' of the second port 248 is preferably angled acutely relative to axis D'—D' by about 10–15 degrees, but, nonetheless, preferably extends into the first port 218. It is believed that such relative orientation of the first port 218 and the second ports (246, 248) helps to reduce the wear rate of the internal parts as was discussed above with respect to another preferred embodiment of the present invention.

As can also be seen in FIGS. 9, 12, 13 and 16, a preferred cover plate 242 is provided with a hollow support stem 250 that is adapted to rotatably support a rotary actuator pin 252 of a rotary actuator 251. In a preferred embodiment, a rotary actuator of the type manufactured by Bray Valve and Controls which is a subsidiary of Bray International, Inc. 13333 Westland East Blvd., Houston, Tex. 77041 is employed. However, other actuator mechanisms can be successfully employed. As can be seen in FIG. 9, a rotary actuator pin 252 is operably attached to the actuator 251 in a known manner and extends through the valve stem 250 into the interior 226 of the body 212. In a preferred embodiment, the rotary actuator pin 252 is rotatably supported within the stem 250 by a pair of flanged bearings 254 preferably manufactured from bronze; however, other bearing arrangements could be employed. Also, to achieve a fluid-tight seal between the end plate 242 and the actuator pin 252, a pair of compression packing rings 256, preferably fabricated from Kevlar® made by the Crane Company or other suitable commercially available materials, are between the inner wall of the actuator stem 250 and the actuator pin 252. A flanged follower 258 is also preferably received on the actuator pin 252 as shown in FIG. 9. The follower 258 has a plurality of bores therethrough that are adapted to receive corresponding fastener capscrews 259 which facilitate adjustable attachment of the follower to the end plate 242. The skilled artisan will appreciate that, by adjusting the position of the follower 258 on the actuator pin 252, the compression packing rings 256 can be compressed a sufficient amount to prevent the passage of fluid between the stem 250 and the actuator pin 252.

Figure 16:
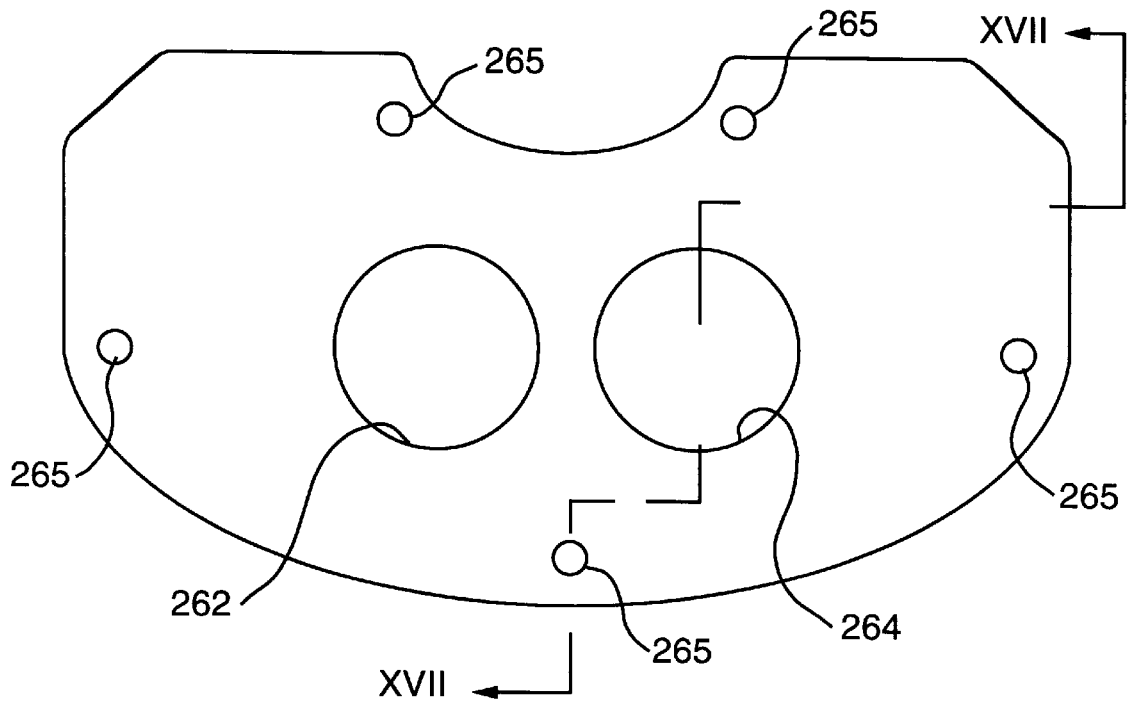
FIG. 16 is a plan view of a preferred valve seat of the valve of FIG. 9.
Figure 17:
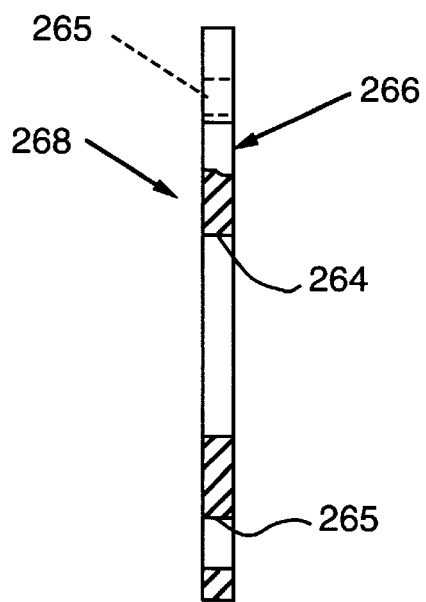
FIG. 17 is a cross-sectional view of the valve seat of FIG. 16 taken along line XVII—XVII of FIG. 16.

This embodiment of the present invention also includes the unique and novel aspect of employing a removable seat member 260. Seat member 260 is preferably shaped as shown in FIGS. 16 and 17 and has a first bore 262 that corresponds with port 246 and a second bore 264 that corresponds with port 248. In a preferred embodiment, seat member 260 is fabricated from cast "Ni-Hard" alloy (ASTM A532-82) which was originally formulated by the International Nickel Company. Such material preferably has a minimum surface hardness of 550 BHN; however other suitable materials could also be used. Seat 260 has a first side 266 that is adapted to confront the cover plate 242 and a second contact side 268 that is adapted to engage a valve gate. Side 268 is preferably machined with a flatness tolerance of 0.001 inches and a finish of 16 micro inches; however, flatness tolerances of at least 0.002 inches and a finish of at least 32 micro inches could also provide acceptable results. In addition, to facilitate removable attachment to the cover pate 242, the seat 260 is provided with a plurality of bolt holes 265 for receiving attachment bolts 269 therethrough. See FIG. 9.

Figure 18:
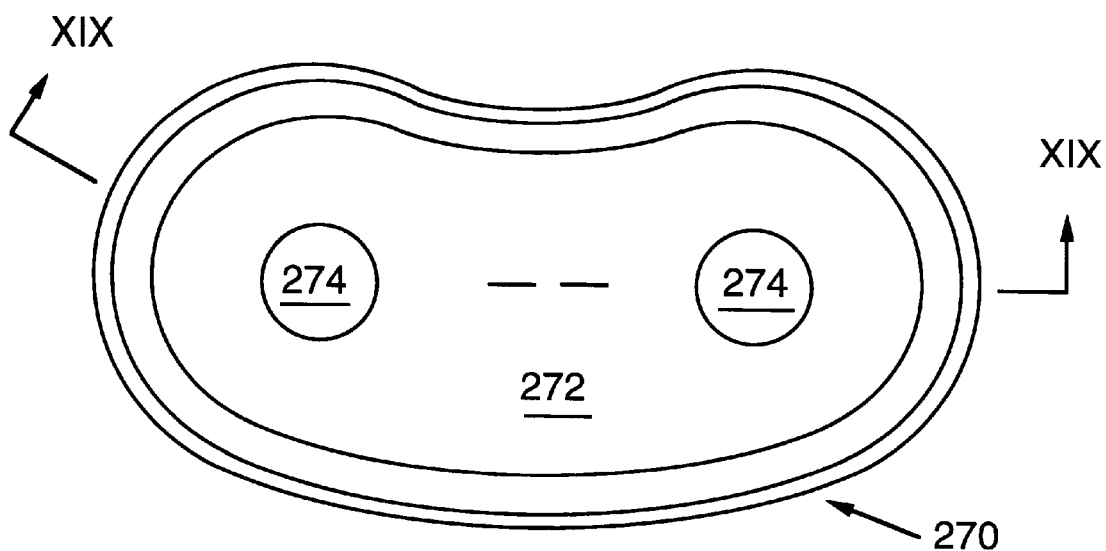
FIG. 18 is a plan view of the preferred valve gate of the valve of FIG. 9.
Figure 19:
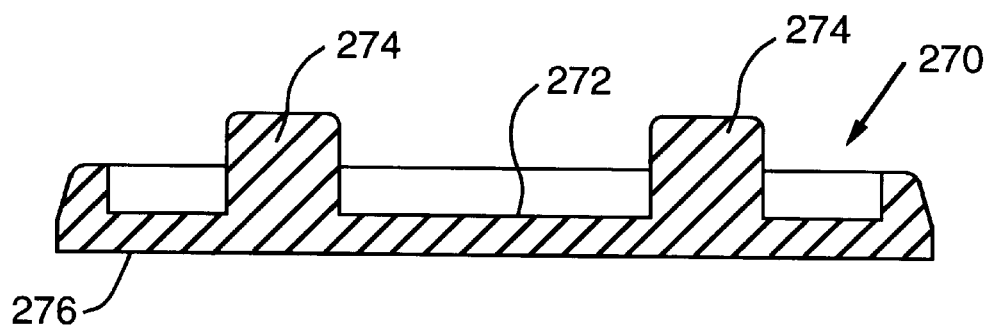
FIG. 19 is a cross-sectional view of the valve gate of FIG. 18 taken along line XIX—XIX of FIG. 18.

FIGS. 18 and 19, illustrate a preferred valve gate 270 of the present invention. Valve gate 270 is preferably fabricated from cast NI-Hard material and has a first side 272 that is preferably cast with a pair of upstanding attachment pins 274. The second contact side 276 of valve gate 270 is preferably machined with a flatness tolerance of 0.001 inches and a finish of 16 micro inches; however, a flatness tolerance of at least 0.002 inches and a finish of at least 32 micro inches could provide acceptable results.

Figure 20:
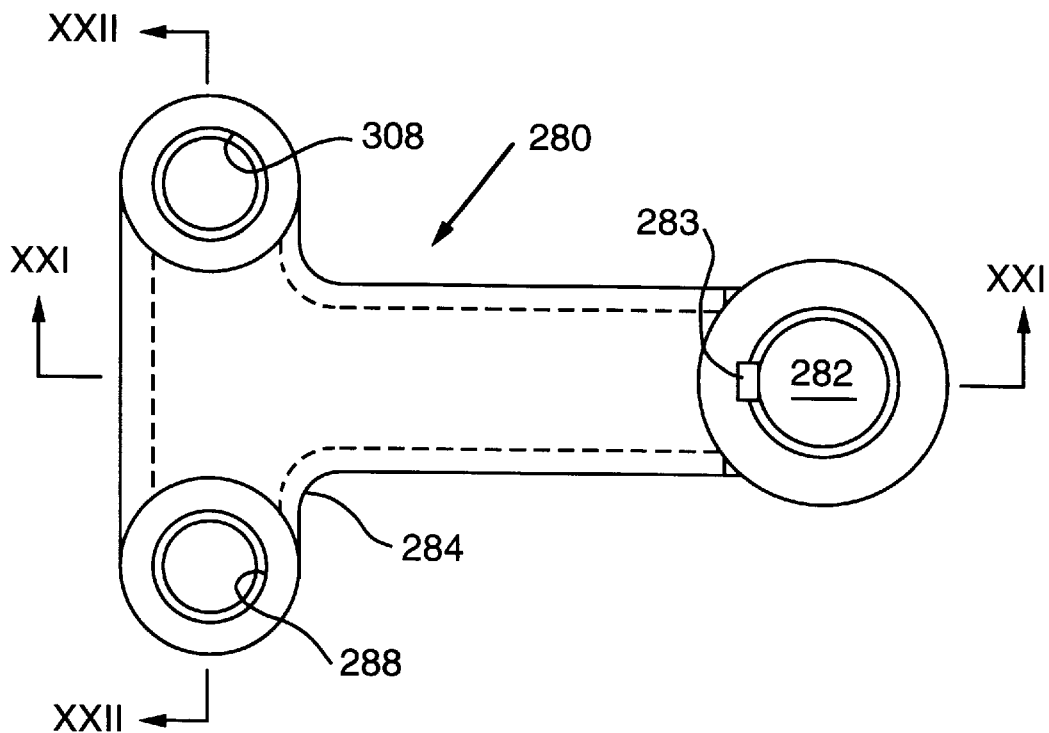
FIG. 20 is a plan view of a preferred valve gate arm of the valve in FIG. 9.
Figure 21:
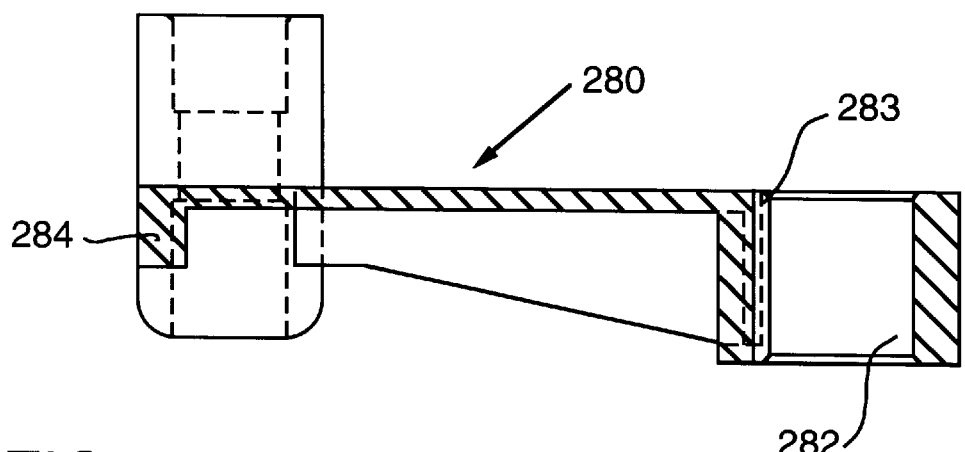
FIG. 21 is a cross-sectional view of the valve gate arm of FIG. 20 taken along lines XXI—XXI of FIG. 20.
Figure 22:
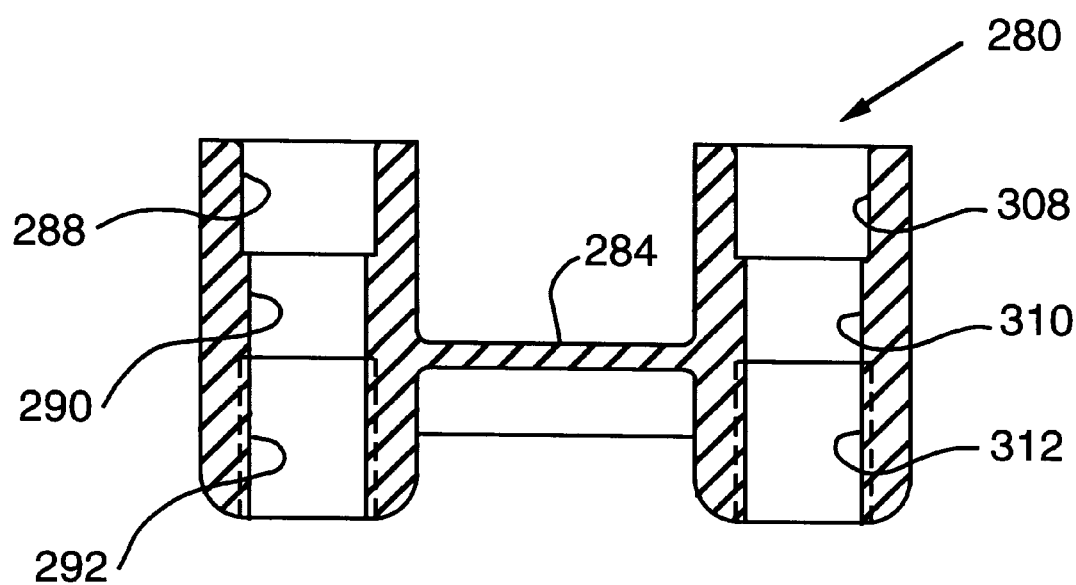
FIG. 22 is a cross-sectional view of the valve gate arm of FIG. 20 taken along line XXII—XXII of FIG. 20.

A preferred valve gate arm 280 is depicted in FIGS. 20–22. Valve gate arm 280 is preferably "T"-shaped and is cast from steel. As can be seen in FIG. 20, a first bore 282 is provided in one end of the valve gate arm 280. Bore 280 is sized to receive therein a portion of the actuator pin 252 as shown in FIG. 9. The valve gate arm 280 has a cross member 284 to facilitate attachment to the valve gate 270. As can bee seen in FIG. 22, one end of the cross member 284 has a plurality of coaxially aligned bores (288, 290, 292). Bore 290 is sized to receive a compression spring 294. See FIG. 9. Bore 292 is preferably threaded to receive a threaded spring adjustment member 300. As can be seen in FIG. 9, threaded adjustment member 300 preferably has a threaded portion 302 and a pin member 304 that protrudes from the end of the threaded portion 302 to extend into a compression spring 294. To facilitate rotatable adjustment of the spring adjustment member 300 and adjust the spring tension to a suitable magnitude, a hexagonally-shaped socket 306 is provided in the end of the threaded portion 302.

The other end of the cross member 284 is provided with a series of coaxially aligned bores (308, 310, 312). Bore 308 is sized to receive therein an attachment pin 274 of the valve gate 270. Preferably, to reduce manufacturing costs associated with attaching the gate arm 280 to the valve gate 270 (which are both preferably cast items) bore 308 has a slightly elongated portion as can be seen in FIGS. 20 and 22. The skilled artisan will appreciate that such arrangement alleviates the need to machine the attachment pins and the bores 288 and 308 for a proper fit. Bore 310 is sized to receive therein another compression spring 294. Bore 312 is threaded to receive another threaded spring adjustment member 300 therein. To attach the gate arm 280 to the actuator pin 252, a keyway 283 is provided in the valve arm 280 to enable the actuator pin 252 to be non-rotatably attached to the gate arm 280 with a piece of key stock in a known manner. In addition, a cap plate 285 and a cap screw 287 are employed in the manner shown in FIG. 9 to attach the gate arm 280 to the actuator pin 252. Those of ordinary skill in the art will appreciate that the compression springs 294 serve to bias the valve gate 270 away from the gate arm 280 and into sealing contact with the valve seat 260. By screwing the threaded spring adjustment members 300 into their respective threaded bores (292, 308) to compress springs 294, the amount of biasing force that biases the valve gate 270 into sealing contact with the valve seat 260 is increased.

Thus, when assembled in the above-described manner, the skilled artisan will appreciate that virtually all of the parts that are most susceptible to wear when the valve 210 is used in connection with a fluid that is carrying abrasive particles are attached to the cover plate 242. Therefore, the entire cover plate assembly 240 can be removed from the housing 212 and replaced with a spare assembly or the cover plate assembly 240 that contains the worn part(s) can be repaired at the installation site or taken, in one piece, to a maintenance area for repair.

Those of ordinary skill in the art will also appreciate that the amount of tension between the valve gate 270 and the seat 260 can be adjusted by altering the amount of spring tension generated by the compression springs 294. Such adjustment of tension can be achieved by screwing the spring adjustment members 300 into or out of the threaded bores (292, 312). In addition, it has been discovered that by fabricating the valve gate and valve seat out of NI-Hard material, the galling and gouging of those elements' confronting surfaces typically encountered when utilizing other material combinations was not experienced. That is, if particulate material such as ash particles are permitted to become embedded in the contact surfaces between the gate 270 and seat 260, grooves can develop in those elements and, if the valve is permitted to continue to operate the contact surfaces of those elements can begin to erode. It has been observed that the sealing surfaces of the present invention, when under a sufficient amount of spring tension tended to remove such particles as the valve gate 270 was moved relative to the seat 260. It has been further observed that any particles that were not removed from between the confronting contact surfaces of the valve gate 270 and valve seat 260 resulted in a "lapping" of the two surfaces. "Lapping" is known in the art as an abrasive machining process wherein abrasive particles are embedded into a soft material called a lap. As the lap is rubbed against a hard surface, the abrasive particles in the surface of the lap remove small amounts of material from the harder surface. Such machining process is commonly used to obtain very flat or smooth surfaces. Thus, such lapping which is attributable to the usage of Ni-Hard material and the self-cleaning action serves to maintain the valve seal during periods of continued usage.

In a preferred embodiment, when the plate assembly 242 is attached to the body 212 as shown in FIG. 9, a chamber 360 is formed within the interior 226 of the body 212 between the cover plate assembly 240 which contains the second ports (246, 248) and the first port 218 provided in the valve body 212. When measured with respect to the cross-sectional area of ports (246, 248), in planes perpendicular to the central axis C'—C' of the first port 218, such as planes containing lines (G', H') shown in FIG. 9, the largest cross-sectional area of the chamber 320 is preferably substantially larger than the smallest cross sectional area of the first port 218 as will be discussed in further detail below.

Figure 14:
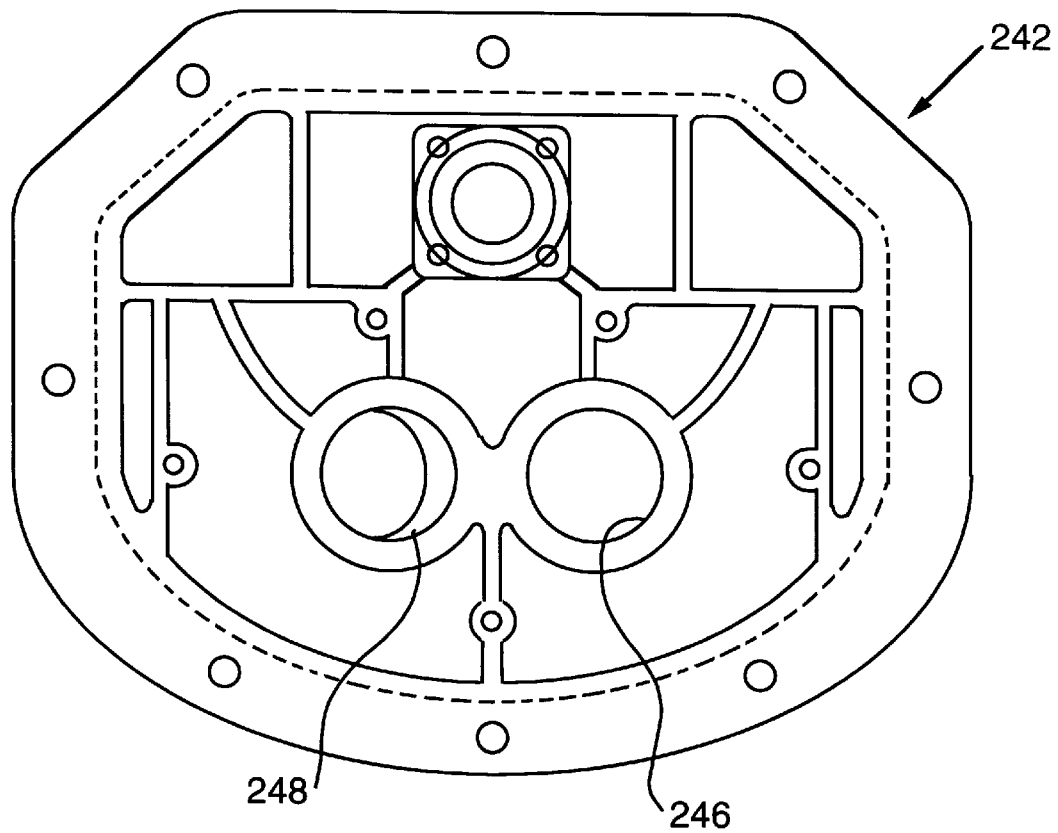
FIG. 14 is a plan view of the under side of the cover plate of FIGS. 12 and 13.
Figure 15:
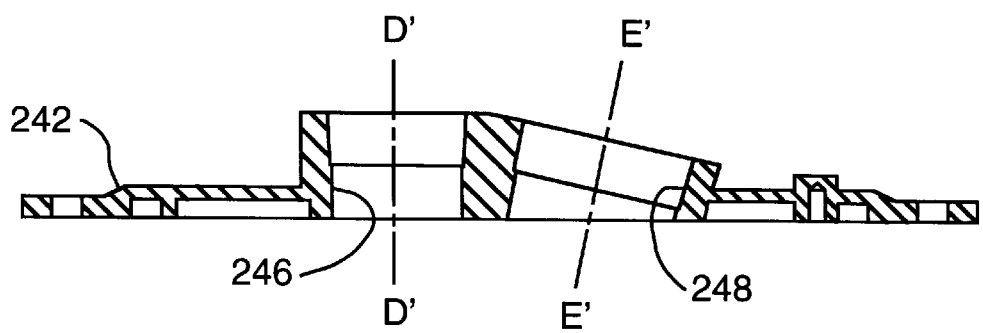
FIG. 15 is a cross-sectional view of the cover plate of FIGS. 12–14 taken along line XV—XV in FIG. 12.

With reference to FIGS. 9 and 14,the structure and operation of this preferred embodiment of the present invention will now be described. As discussed above, the first port 218 is normally in fluid communication with a first fluid source, such as the air within the airlock 1 via the fluid line 7, one second port 246 is normally in fluid communication with one second fluid source, such as the hopper 2 via the fluid line 9, and another second port 248 is normally in fluid communication with another second fluid source, such as the conveying pipe 5, via the fluid line 8. In a first equalizing position, the valve gate 270 is positioned to cover bore 262 in the valve seat 260 and ultimately results in port 246 being closed. The valve gate 270 would be moved to the first equalizing position if used, for example, in a system similar to the one depicted in FIG. 1 and a volume of granular solids was waiting to be dropped from the hopper 2 into the airlock 1. The hopper 2 and the airlock 1 would thus be in fluid communication, and the pressure of the air in the airlock 1 would be nearly equal and nearly at atmospheric pressure. The volume of granular solids could then be dropped into the airlock 1 by means of the valve 3.

To close both openings in the valve seat (262, 264) and ultimately to block ports (246, 248), the rotary actuator 251 is actuated to rotate the actuator pin 252 and the valve gate arm 280 to a position wherein the valve gate 270 blocks the openings (262, 264) in the valve seat 260. Continued movement of the gate arm 280 in a first direction causes the valve gate 270 to move to a second equalizing position wherein opening 264 and port 248 are blocked. In such second equalizing position, the valve gate 270 restrains fluid flow through the port 248 and permits fluid to flow through the port 246 to equalize substantially the fluid pressure between the first fluid source and the other second fluid source. If the valve 210 was being used in a system similar to the one depicted in FIG. 1, the conveying pipe 5 would thus be in fluid communication with the airlock 1 and the pressure of the air in the airlock 1 would thus substantially equalize to the much higher pressure of the air in the conveying pipe 5. The pressure would normally not completely equalize because of the pressure drops inherent in the system. The solids would then be dropped into the conveying pipe 5 by means of the valve 4 and carried away through the pipe 5.

When the rotary actuator 251 and valve gate arm are operated in reverse, the valve gate 280 moves back through the intermediate position to the first equalizing position, wherein fluid flow through the second port 246 is restrained and fluid flow through the second port 246 is permitted to equalize substantially the fluid pressure between the first fluid source and the second fluid source. If the valve 210 was being used in connection with a system similar to the system depicted in FIG. 1, the airlock 1 and the hopper 2 would again be in fluid communication and the pressure of the air in the airlock 1 would substantially equalize with the near atmospheric pressure of the air in the hopper 2.

During each pressure equalization process, the velocity of the fluid entering the chamber 320 in the valve body 212, for example through the first port 218, may achieve almost sonic speeds, due to the extreme pressure differentials that are expected to exist during normal use between the first and second fluid sources, respectively. However, as measured in planes perpendicular to the central axis C'—C' of the first port 218, the largest cross-sectional area of the chamber 320 is substantially larger than the smallest cross-sectional area of the first port 218. This increase in area in the direction of fluid flow combined with a finite chamber volume results in a decrease in velocity and a significant decrease in wear rates of the valve components. In actual tests, a valve 210 having a largest cross-sectional area of approximately nine times the smallest cross-sectional of the first port and a volume of approximately at least 620 cubic inches has been found to have substantially improved wear rates over prior pressure equalization valves. The skilled artisan will appreciate that the chamber 320 must have an appreciable volume to effectively reduce the fluid velocity. In the present preferred embodiment, the chamber volume is preferably at least 620 cubic inches. It is estimated that the velocity of fluid flowing within such valve is reduced by about nine times from the first port 218 to a second port (246, 248). As stated hereinabove, it is believed that the wear rate of the valve components varies proportionately with $v^3$, and it is thus estimated that the wear rate on the valve actuator and the valve gate of such valve may be reduced by as much as 729 times. Because of the exponential relation between velocity and wear rate, it is believed that a chamber 320 having a largest cross-sectional area of approximately at least nine times the smallest cross-sectional area of the first port 218 and a volume of at least 620 cubic inches would substantially reduce the velocity of fluid flowing through the chamber 320, and would produce advantageous wear results. In such a valve, it is estimated that the fluid velocity would be reduced about nine times, to produce a wear rate reduction on the order of 729 times.

In addition, it is believed that the positioning of the second ports (246, 248) on the second wall of the housing opposite the first port 218 such that one of the central axes (D'—D', E'—E') of the second ports (246, 248), respectively, is coaxially aligned with the central axis C'—C' of the first port 218, and the other of the central axes (D'—D', E'—E') is angled within 10–15 degrees relative thereto and thus lie on lines that extend into the first port 218, helps to reduce wear of the internal valve parts. Because of this positioning of the second ports (246, 248), a fluid flowing from the first port 218 to a second port 246 or 248, or from a second port 246 or 248 to the first port 218, thus subjects the internal valve parts to relatively less direct blasting from granular solid entrained in the fluid.

Those of ordinary skill in the art will also appreciate that because the valve gate 280 reaches the intermediate position wherein fluid flow through both of the second ports (246, 248) is restrained each time that it moves between the first and second equalizing positions, the valve 210 restrains transient cross-equalization between the second fluid sources. When the valve 210 is used with a vacuum system, this feature is useful to restrain the unintended flow of granular solids entrained in a fluid into a vacuum pump, thereby reducing wear on and maintenance of the pump.

The principles, preferred embodiments and the modes of operation of the present invention have been described in the foregoing specification. However, the invention which is intended to be protected is not to be construed as limited to the particular embodiments disclosed. The embodiments are therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

What is claimed is:

1. A pressure equalization valve for alternatingly equalizing pressures between a first fluid source and at least two second fluid sources, comprising:

a valve body including a first port in fluid communication with the first fluid source, said first port having a central axis, said valve body further including at least two second ports, each in fluid communication with a respective second fluid source, each said second port having a central axis wherein said central axis of at least one said second port forms an acute angle with said central axis of said first port;

a valve gate movable between a first equalizing position wherein said valve gate allows fluid flow through one of said second ports and restrains fluid flow through another of said second ports to substantially equalize the fluid pressure between the first fluid source and one of the second fluid sources, and a second equalizing position, wherein said valve gate allows fluid flow through said another of said second ports and restrains fluid flow through said one of said second ports to equalize substantially the fluid pressure between the first fluid source and another of the second fluid sources;

a valve seat at each of said second ports, said valve seat having a contact surface and wherein said valve gate has a contact surface adapted to slidably confront said contact surface of said valve seat, said valve gate and said valve seat being fabricated from Ni-Hard material such that, when a particulate material is introduced between said contact surface of said valve seat and said contact surface of said valve gate, said sliding confrontation of said contact face of said valve seat with said contact face of said valve rate causes said contact face of said valve seat and said contact face of said valve gate to become smoother; and a chamber in said valve housing between said first port and said second ports, wherein said chamber has a predetermined volume such that the velocity of fluid flowing between said first port and at least one of said second ports is substantially reduced.

2. A pressure equalization valve as claimed in claim 1, wherein a said predetermined volume of said chamber is at least 620 cubic inches.

3. A pressure equalization valve as claimed in claim 1 wherein as measured in planes perpendicular to the central axis of said first port, a largest cross-sectional area of said chamber is at least nine times larger than a smallest cross-sectional area of said first port.

4. A pressure equalization valve as claimed in claim 1, wherein said valve gate is further movable to an intermediate position intermediate said first and second equalizing positions, wherein said valve gate restrains fluid flow through both said second ports.

5. A pressure equalization valve as claimed in claim 1 wherein said contact surfaces of said valve seat and said valve gate have a flatness tolerance of at least 0.002 inches and a surface finish of at least 32 micro inches.

6. A pressure equalization valve as claimed in claim 1 wherein said valve gate is attached to a rotary actuator for moving said valve gate between said first and second equalizing positions.

7. A pressure equalization valve as claimed in claim 6, wherein said rotary actuator is attached to said cover plate and has a rotatable actuator pin extending into said valve body and wherein said pressure equalization valve further comprises a valve gate arm attached to said actuator pin and said valve gate.

8. A pressure equalization valve as claimed in claim 7, wherein said valve gate is adjustably biased away from said valve gate arm into sealing contact with said valve seat.

9. A pressure equalization valve as claimed in claim 1 further comprising a cover plate removably attached to said valve body, said cover plate having said second ports extending therethrough and said valve seat attached thereto and surrounding each said second port to sealingly confront said valve gate as said valve gate is moved between said first and second equalizing positions.

10. A pressure equalization valve as claimed in claim 1, wherein said central axis of at least one other said second port is coaxially aligned with said central axis of said first port.

11. A pressure equalization valve as claimed in claim 1 wherein at least some of said particulate material is wiped away from said contact surface of said valve seat as said contact surface of said valve gate slidingly engages said contact surface of said valve seat.

12. A pressure equalization valve for alternatingly equalizing pressures between a first fluid source and at least two second fluid sources, comprising:

a valve body including a first port in fluid communication with the first fluid source, said first port having a central axis, said valve body further including at least two second ports, each in fluid communication with a respective second fluid source, each said second port having a central axis wherein said central axis of at least one said second port forms an acute angle with said central axis of said first port;

a valve gate movable between a first equalizing position wherein said valve gate allows fluid flow through one of said second ports and restrains fluid flow through another of said second ports to substantially equalize the fluid pressure between the first fluid source and one of the second fluid sources, and a second equalizing position, wherein said valve gate allows fluid flow through said another of said second ports and restrains fluid flow through said one of said second ports to equalize substantially the fluid pressure between the first fluid source and another of the second fluid sources, said valve gate being further movable to an intermediate position intermediate said first and second equalizing positions, wherein said valve rate restrains fluid flow through both said second ports;

a valve seat at each of said second ports, said valve seat having a contact surface and wherein said valve gate has a contact surface adapted to slidably confront said contact surface of said valve seat, said valve gate and said valve seat being fabricated from Ni-Hard material such that, when a particulate material is introduced between said contact surface of said valve seat and said contact surface of said valve gate, said sliding confrontation of said contact face of said valve seat with said contact face of said valve gate causes said contact face of said valve seat and said contact face of said valve gate to become smoother; and a chamber in said valve housing between said first port and said second ports, wherein as measured in planes perpendicular to said central axis of said first port, a largest cross-sectional area of said chamber is at least nine times larger than a smallest cross-sectional area of said first port.

13. A pressure equalization valve as claimed in claim 12 wherein said contact surfaces of said valve seat and valve actuator have a flatness tolerance of at least 0.002 inches and a surface finish of at least 32 micro inches.

14. A pressure equalization valve as claimed in claim 12 wherein said valve gate is attached to a rotary actuator for moving said valve gate between said first and second equalizing positions.

15. A pressure equalization valve as claimed in claim 12 further comprising a cover plate removably attached to said valve body, said cover plate having said second ports extending therethrough and said valve seat attached thereto and surrounding each said second port to sealingly confront said valve gate as said valve gate is moved between said first and second equalizing positions.

16. A pressure equalization valve as claimed in claim 15 further comprising:

a rotary actuator attached to said cover plate, said rotary actuator having a rotatable actuator pin extending into said valve body; and a valve gate arm attached to said actuator pin and said valve gate.

17. A pressure equalization valve as claimed in claim 16, wherein said valve gate is biased away from said valve gate arm into sealing contact with said valve seat.

18. A pressure equalization valve as claimed in claim 12, wherein said central axis of at least one other said second port is coaxially aligned with said central axis of said first port.

19. A pressure equalization valve as claimed in claim 12 wherein at least some of said particulate material is wiped away from said contact surface of said valve seat as said contact surface of said valve gate slidingly engages said contact surface of said valve seat.

20. A removable cover plate assembly for a pressure equalization valve having a valve body having a first port therein having a first central axis and being in fluid communication with a first fluid source, said removable cover plate assembly comprising:

a cover plate removably attachable to said valve body, said cover plate having at least two second ports each constructed for fluid communication with a respective second fluid source, each said second port having a central axis wherein said central axis of at least one said second port forms an acute angle with respect to the central axis of at least one said first port when said cover plate is attached to said valve body;

a valve seat attached to said cover plate adjacent to each said second port, said valve seat having a contact surface;

a valve gate movably attached to said cover plate and being constructed for sliding confrontation with said valve seat to permit fluid flow through one of said second ports and restrain fluid flow through another of said second ports to equalize substantially fluid pressure between the first fluid source and one of said second fluid sources and a second equalizing position wherein said valve gate restrains fluid through said one of said second ports and permits fluid flow through said other of said second ports, said valve gate having a contact surface adapted to slidably confront said contact surface of said valve seat, said valve gate and said valve seat being fabricated from Ni-Hard material such that, when a particulate material is introduced between said contact surface of said valve seat and said contact surface of said valve gate, said sliding confrontation of said contact face of said valve seat with said contact face of said valve gate causes said contact face of said valve seat and said contact face of said valve gate to become smoother; and a rotary actuator attached to said cover plate and said valve gate for selectively moving said valve gate between said first and second equalizing positions.

21. A removable cover plate assembly as claimed in claim 20 wherein said contact surfaces of said valve seat and valve actuator have a flatness tolerance of at least 0.002 inches and a surface finish of at least 32 micro inches.

22. A pressure equalization valve as claimed in claim 20, wherein said central axis of at least one other said second port is coaxially aligned with said central axis of said first port when said cover plate assembly is attached to said valve body.

23. A pressure equalization valve as claimed in claim 20 wherein at least some of said particulate material is wiped away from said contact surface of said valve seat as said contact surface of said valve gate slidingly confronts said contact surface of said valve seat.

* * * * *